Figure 1:
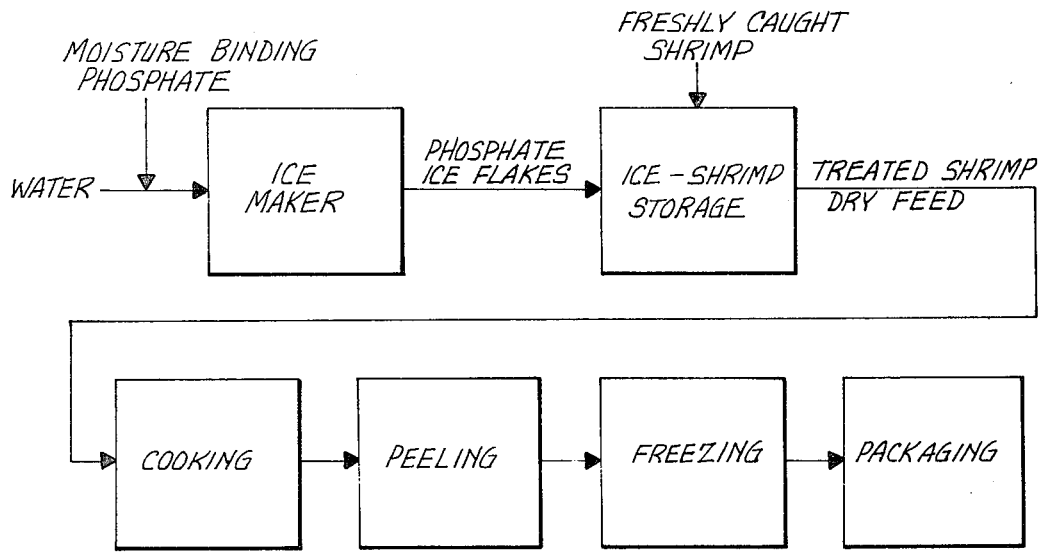

United States Patent [19]

Stone

[11] 4,293,578
[45] Oct. 6, 1981

[54] METHOD OF TREATING FRESH SHRIMP TO REDUCE MOISTURE AND NUTRIENT LOSS

[76] Inventor: Everett W. Stone, P.O. Box 2168, Kodiak, Ak. 99615

[21] Appl. No.: 135,474

[22] Filed: Mar. 31, 1980

[51] Int. Cl.$^3$ .............................................. A22C 25/00
[52] U.S. Cl. .................................... 426/332; 426/66; 426/643; 426/524
[58] Field of Search ................... 426/66, 68, 327, 332, 426/643, 418, 524

[56] References Cited

U.S. PATENT DOCUMENTS

| | | | |
|---|---|---|---|
| 2,488,184 | 11/1949 | Garnatz et al. | 426/643 |
| 2,555,236 | 5/1951 | Kreidl et al. | 426/643 X |
| 2,735,777 | 2/1956 | Meyer | 426/643 X |
| 2,755,191 | 7/1956 | Schmitz | 426/66 X |
| 3,036,923 | 5/1962 | Mahon | 426/327 X |
| 3,620,767 | 11/1971 | Swartz | 426/643 X |
| 4,221,819 | 9/1980 | Falci et al. | 426/643 X |

FOREIGN PATENT DOCUMENTS

| | | | |
|---|---|---|---|
| 224242 | 3/1958 | Australia | 426/332 |
| 600990 | 7/1960 | Canada | 426/327 |
| 688123 | 6/1964 | Canada | 426/332 |

OTHER PUBLICATIONS

Shewan, J. M. "Preservation of FIsh by the Use of Nitrite Ice", Nature, Oct. 7, 1950, No. 4223, pp. 613–614.

Fieger, E. A., et al., "Chemical Ices for Shrimp Preservation", Dec. 1956, Food Technology.

*Primary Examiner*—Robert A. Yoncoskie
*Attorney, Agent, or Firm*—Delbert J. Barnard

[57] ABSTRACT

Fresh shrimp are stored in flake or crushed ice containing a moisture binding phosphate from the time that they are harvested until they are processed, including both aboard the fishing vessel and in the processing plant. An effective amount of sodium tripolyphosphate, $Na_3P_5O_{10}$ is admixed to water as it is delivered to an ice making machine. The treated ice and the shrimp are introduced together into a storage receptacle. The ice melts as it cools the shrimp, to in that manner bring the moisture binding phosphate into contact with the shrimp meat. It is preferred to use flake ice which contains about one to two percent (1.0–2.0%) by weight of sodium tripolyphosphate, $Na_3P_5O_{10}$.

16 Claims, 3 Drawing Figures

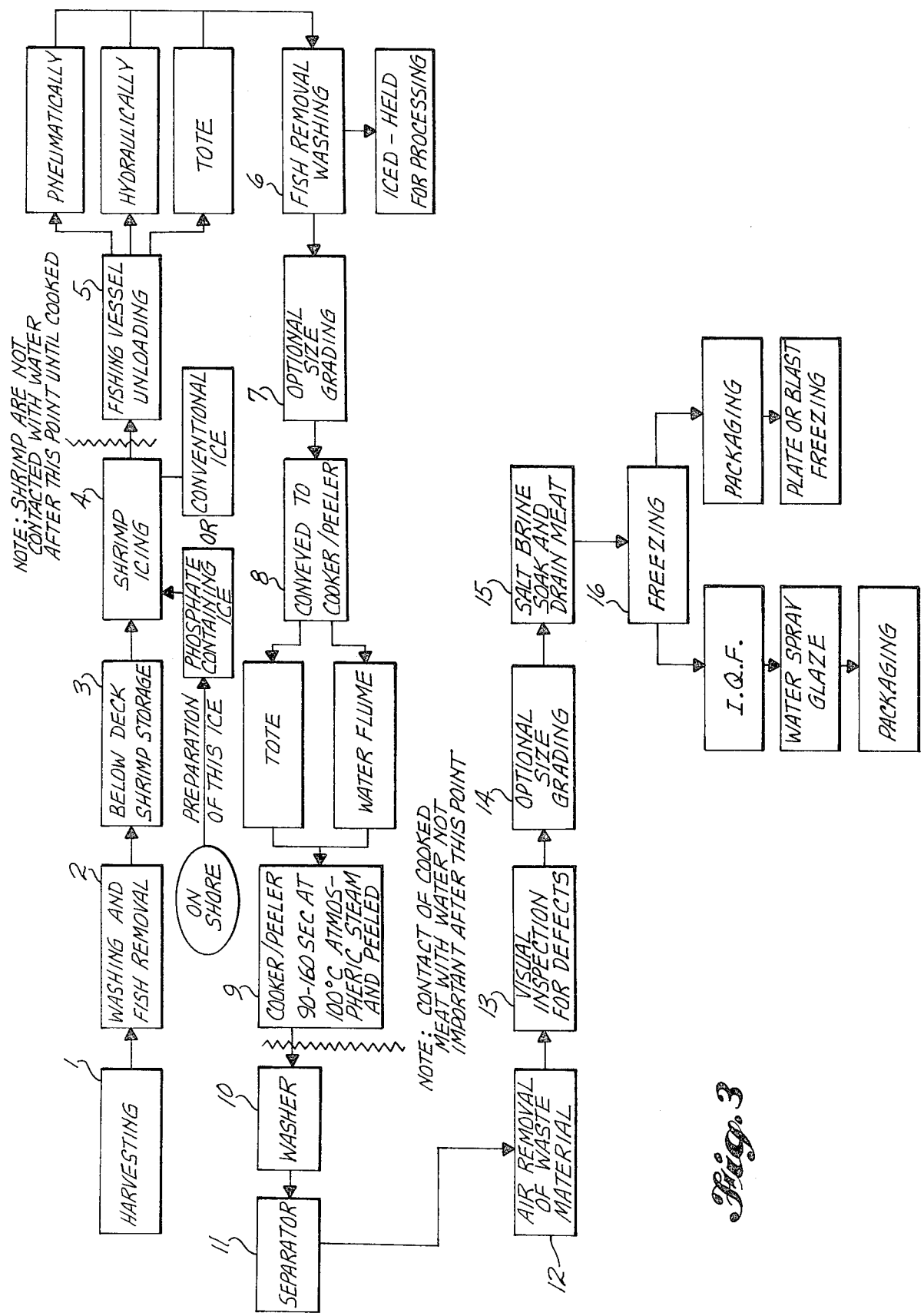

METHOD OF TREATING FRESH SHRIMP TO REDUCE MOISTURE AND NUTRIENT LOSS

BACKGROUND OF THE INVENTION

1. Field of the Invention

This invention relates to a method of treating fresh shrimp or the like for reducing moisture loss during storage and processing, to in that manner increase yield and at the same time improve the nutritional value and palatability of the final shrimp meat product.

2. Problem Addressed

As explained in a Dec. 14, 1978 report published by David L. Crawford, Program Director, Oregon State University Seafoods Laboratory, Department of Food Science and in Technology, shrimp begin to undergo to a time and temperature dependant degradative change in their muscle proteins immediately after they are harvested. This degradative process results in a decrease in the cooked meat yield. The degradative process involves a loss of moisture from the shrimp both during both storage and processing. Studies by George Garnatz, Norbert H. Volle and Fred E. Deatherage indicate the moisture loss during cooking alone can result in losses from 33% to 50%, based on the weight of the green peeled shrimp meat. Liquids that are lost contain significant amounts of soluble protein minerals and other nutrients. This loss results in reduced nutritional value and palatability losses in addition to a reduced yield.

3. Description of the Prior Art

The aforementioned report by David L. Crawford indicates that moisture losses caused by cooking can be decreased by treating the round shrimp with condensed phosphates prior to processing. The report discusses experimental phosphate pretreatment involving the use of a commercially available mixture of sodium tripolyphosphate and sodium hexametaphosphate. In these experiments the water in a precooker feed hopper was treated with the phosphate solution.

U.S. Pat. No. 3,620,767, granted Nov. 16, 1971, to William E. Swartz, relates to the use of a molecularly dehydrated phosphate such as either sodium tripolyphosphate or an orthophosphate for increasing the yield of cooked bonito meat. Bonito is a fish similar to tuna. The process involves injecting the phosphate solution into the meat shortly before cooking the meat.

U.S. Pat. No. 3,036,923, granted May 29, 1962, discloses the uses of sodium and potassium molecularly dehydrated phosphates for inhibiting the loss of moisture, soluble protein, minerals, and vitamins from frozen fish on thawing and cooking. The method employed involves dipping the fish fillets into the phosphate solution for two minutes and then draining them for thirty seconds, prior to freezing.

U.S. Pat. No. 2,488,184, granted Nov. 15, 1949, to George Garnatz, Norbert H. Volle' and Fred E. Deatherage discloses the use of several alkaline salts for treating shrimp, both for increasing the yield and improving the quality of the meat. The method involves soaking raw green peeled shrimp (which may or may not have been frozen and subsequently defrosted) in the alkaline salt solution for about two hours. The shrimp is then removed from the solution and cooked in another solution and while hot is placed into ice water and agistated. Thereafter, the shrimp meat is drained and prepared for commercial retail sale or immediate table use.

In order for any method of increasing yield and/or quality to be of commercial importance, it must fit in well with established harvesting and processing practices.

The usual commercial practice for storing fresh shrimp aboard the fishing vessel is to place the shrimp in a hold mixed with crushed or flake ice. A typical known machine for manufacturing flake ice aboard fishing vessels is disclosed by U.S. Pat. No. 3,735,275, granted Feb. 21, 1956 to Lyle E. Branchflower.

Experiments have been conducted with respect to adding chemical compounds to water which is frozen into ice for icing a catch aboard a fishing vessel. Progress Report No. 67, published by the Fisheries Research Board of Canada, discusses experiments with germicidal ices aboard fishing vessels. The chemicals employed were dissolved in tap water immediately prior to freezing, either in 300 lb. blocks in commercial ice plants or in 30 lb. blocks under laboratory conditions. The block was crushed finely before being used to ice the fish. The experiments were conducted on lingcod and lemon sole. It was learned that fish iced with such ices kept longer than fish iced with ordinary ice because the flesh was maintained at a lower temperature, i.e. the ice formed at a lower temperature than plain water ice. The treated fish were studied to determine whether the chemical ice acted to retard bacterial spoilage of the fish.

An article by E. A. Fieger, M. E. Bailey and A. F. Novak, entitled "Chemical Ices For Shrimp Preservation," appearing in the December 1956 issue of Food Technology, discusses the effect of certain chemical ices on the ice storage life of fresh shrimp, and the relative quality of the treated shrimp. The chemicals investigated were bacteriostatic agents. It was concluded that in general, the quality of the shrimp packed in the chemical ices used in the experiment were slightly superior to that of shrimp packed in commercial plain water ice, but in no instance was the total storage time increased.

The above discussed articles and patents are to be considered a part of my disclosure; it is my desire that they be incorporated by reference into my disclosure.

Additional technology in the patent literature, which together with the above discussed articles and patents should be carefully studied for the purpose of putting the present invention into proper perspective relative to the prior art, is contained within U.S. Pat. No. 1,046,991, granted Dec. 10, 1912, to Alexander Danilevisky; U.S. Pat. No. 2,555,236, granted May 29, 1951, to Ekkehard L. Kreidl and Earl P. McFee; U.S. Pat. No. 2,735,777, granted Feb. 21, 1956, to Albert Meyer and U.S. Pat. No. 2,892,865, granted July 1, 1975, to Alberto Sfeir.

SUMMARY OF THE INVENTION

According to my invention, shrimp are treated aboard a fishing vessel as they are harvested by placing them in a hold, mixed with small ice particles made from water into which an effective amount of a moisture binding phosphate compound has been added, so that as the ice melts the shrimp meat is wetted by the phosphate including water. The expression "an effective amount" means an amount of the moisture binding phosphate compound which, when brought into contact with the shrimp meat by the water produced as the ice melts, will result in a significant reduction in the amount of moisture loss from the shrimp during the storage and processing.

My experiments involved the use of a sodium tripolyphosphate (commonly referred to as "STPP") in varying proportions. However, it is believed that other phosphates, and in particular mixtures which include sodium tripolyphosphate, will also work.

I found that the most economical results are obtained by using a solution of water and one to two percent (1.0–2.0%) by weight of sodium tripolyphosphate. I also discovered that it was desirable to use flake ice. However, it is believed that chunk ice which has been crushed to particle size will also work.

I discovered that addition of the sodium tripolyphosphate to the ice improved "flaking" and also resulted in an ice that was colder than plain water ice.

The ice flakes must not be either too large or too small in order to allow for both close contact with the shrimp and adequate drainage. It is old to add a small amount of salt to the water that is used for making the ice. The salt assists in the formation of ice flakes of desirable size. The use of sodium tripolyphosphate accomplishes the same result. It assists in formation of ice flakes of a desirable size while at the same time produces the additional benefits described herein.

According to an aspect of the invention, an effective amount of a moisture binding phosphate compound, e.g. sodium tripolyphosphate, is admixed into water which is delivered to an ice machine. The shrimp at it is harvested is placed into a hold in admixture with the treated flake ice.

My primary interest has been with the treatment of shrimp, to both increase yield and improve quality of the final cooked meat product. However, it is believed that the process may produce beneficial results when practiced with seafood other than shrimp.

The high shrimp catch volumes, the long length of the fishing period, and the mechanical nature of the shrimp processing industry requires that shrimp be received at the processing plant ready to process. My technique for increasing yield and improving quality of the final meat product involves no departure from the standard steps of handling of the shrimp except that the shrimp are dry fed to the cooker/peeler. It requires no additional step either aboard the fishing vessel or in the plant and in fact eliminates a step.

Although not clearly identifiable, the means by which my invention produces its significant results is believed to be by increasing the moisture binding capacity of the shrimp tissue.

Other features, objects, advantages of my invention will be apparent from the detailed description which follows in which reference is made to the drawing.

BRIEF DESCRIPTION OF THE PREFERRED EMBODIMENT

Referring now to FIG. 1, a moisture binding phosphate is admixed to water and the mixture is delivered to a conventional ice maker. By way of typical example, the ice maker may be a flake ice maker of the type manufactured by North Star Ice Equipment Company, Inc., of Seattle, Wash. 98107. The basic construction of such an ice maker is disclosed by U.S. Pat. No. 2,735,275, granted Feb. 21, 1956, to Lyle E. Branchflower.

The mixture of water and moisture binding phosphate are sprayed onto the refrigerated surface of the ice maker. Blades traveling relative to such surface scrape off flakes of ice which are collected. The collected ice flakes is then moved into storage aboard the fishing vessel. During harvesting the ice and the freshly harvested shrimp are introduced together into a storage compartment or hold. The ice gradually melts as it works to cool the shrimp. As the ice melts the resulting liquid wets the shrimp meat and in this manner the moisture binding phosphate is brought into contact with the shrimp meat. In other respects the treated shrimp is handled the same way that shrimp cooled by plain water ice is handled except that the shrimp are not washed in the processing plant prior to peeling.

Preferably, the shrimp is packed in flake ice containing a moisture-binding phosphate at all times during which it is in storage or transit, from the time it is harvested up to the time of actual processing in the processing plant.

Tests which I conducted clearly established that shrimp held in ice containing a moisture-binding phosphate showed a significantly increased yield of cooked meat, improved nutritional value and palatability. It is believed that these improved characteristics of the shrimp resulted from the moisture-binding capacity of the shrimp tissue being increased because of the shrimp meat being brought into contact with the moisture-binding phosphate.

In actual tests, shrimp were iced aboard a fishing vessel with ice containing sodium tripolyphosphate ($N_3P_5O_{10}$). The shrimp was maintained in the ice from between four to eight days. Following such icing, the unwashed shrimp were dry fed, without being washed, to mechanical processing equipment for cooking, peeling and freezing.

Shrimp processed in accordance with my present invention were compared with shrimp which were cooled by plain water ice. The cooked, peeled shrimp meat of both the phosphate and the plain water ice cooled shrimp were weighted and compared with their respective green or fresh in shell weight. Herein the term "processed meat yield" means the weight of the cooked, peeled shrimp meat, expressed as a percentage of the initial, green or "fresh" in shell weight.

Also, the increase in phosphate content of the cooked shrimp meat was determined. This was done by determining the total $P_2O_5$ content of the treated and untreated shrimp and then subtracting the total $P_2O_5$ content of the untreated, processed shrimp meat from the total $P_2O_5$ content of the treated, processed shrimp meat. The result was expressed as a positive or negative change in $P_2O_5$; i.e. a gain or loss in $P_2O_5$.

As best shown by the following table, setting forth the test results, each set of test results represents a different lot of shrimp. As a result, large variations were obtained between sets of results because of variations in composition of the shrimp meat. Factors such as maturity, month of year in which the catch was made, etc., all may effect shrimp flesh composition.

| | EFFECT OF SODIUM TRIPOLYPHOSPHATE (STPP) LEVEL ON THE PROCESSES MEAT YIELD OF ICED SHRIMP | | | | |
|---|---|---|---|---|---|
| Test No. | Wt. of Green Shrimp In Pounds | Ice Composition | Cooked Meat Yield Percent Of Green Weight | Percent Total Phosphate | Δ $P_2O_5$ |
| 1 | 25 | 0.5 STPP | 25.76 | 0.319 | +0.002% |
| 1A | 25 | Water | 25.04 | 0.317 | |

-continued

EFFECT OF SODIUM TRIPOLYPHOSPHATE (STPP) LEVEL ON THE PROCESSES MEAT YIELD OF ICED SHRIMP

| Test No. | Wt. of Green Shrimp In Pounds | Ice Composition | Cooked Meat Yield Percent Of Green Weight | Percent Total Phosphate | Δ $P_2O_5$ |
|---|---|---|---|---|---|
| 2 | 12 | 1.0 STPP | 33.25 | 0.399 | |
| | | | | | −0.001% |
| 2A | 12 | Water | 29.38 | 0.400 | |
| 3 | 25 | 1.84 STPP | 12.50 | 0.128 | |
| | | | | | −0.001% |
| 3A | 25 | Water | 8.30 | 0.12 | |
| 4 | 25 | 4.0 STPP | 26.56 | 0.424 | |
| | | | | | −0.008% |
| 4A | 25 | Water | 21.18 | 0.432 | |

I used the phosphate analysis method that is described in the Chemistry Laboratory Guide Book of the United States Department of Agriculture, January 1979 Edition, procedure No. 3006-Quinolinium Phosphomolybdate, pages 3–13.

The test results clearly demonstrate that ice containing STPP at concentrations of one percent or greater by weight is far superior to untreated ice prepared from water only. The results also indicate that the effectiveness of STPP increases with increasing concentration as reflected by increased processed shrimp meat yields.

Figure 2:
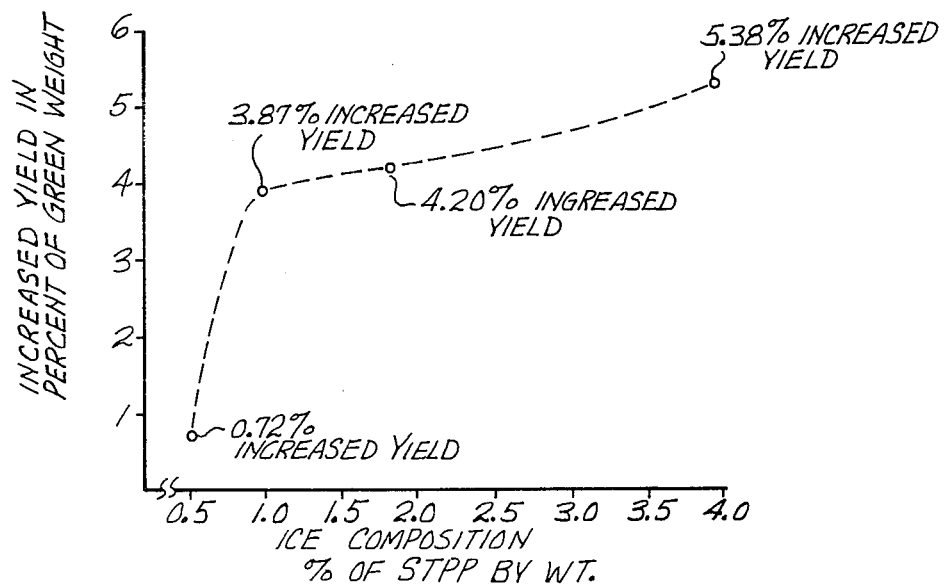

FIG. 2 is a graph of increased yield in percent versus the percent of sodium tripolyphosphate, $Na_3P_5O_{10}$, in the ice solution. It shows that a relative low benefit is obtained by use of solutions below one percent. It also shows a relatively low rate of benefit gain above one percent. Comparing the cost of additional sodium tripolyphosphate, $Na_3P_5O_{10}$, to increased gain, the most economical results obtained by the use of a 1.0–2% solution of sodium tripolyphosphate, $Na_3P_5O_{10}$.

It is interesting to note that ices of my invention exhibit their remarkable effect without any significantly detectable absorption of STPP by the processes shrimp meat at the levels employed in my tests. This fact is reflected by the lack of significant differences between percent total phosphate (added phosphate) of treated and untreated processed shrimp meat in the above Table. One very distinct benefit of incorporating the phosphate solution into water used for forming ice which is, in turn, used for preserving fish between the time of catch and processing is that the fish meat is exposed to the phosphate solution for a relatively long time, but without any additional time-consuming steps being added to the total treatment of the shrimp. If the shrimp meat were to be merely dipped into a phosphate solution at some time prior to processing, this would require an additional handling of the shrimp and an additional period of time. Most likely, the time period would be relatively short for the purpose of minimizing the additional time added to the overall process. This would mean that the shrimp meat would be exposed to the phosphate solution for only a small amount of time and the benefits of a longer exposure would not be obtained.

The term "dry feeding" as used herein means that the raw, inshell shrimp are conveyed or fed to the cooker/peeler on a dry conveyor belt; the shrimp are not subjected to any water until after the cooking step.

The conventional way of feeding or conveying shrimp into a cooker/peeler is to dump the raw, inshell shrimp into a water filled hopper from which they are fed onto a perferated plastic conveyor belt which carries them to the cooker portion of the cooker/peeler machine. The hopper is filled with water and the conveyor belt runs in the water.

"Dry feeding" is employed in my process for the purpose of preventing water leaching or removal of the water binding phosphate from the shrimp meat prior to cooking.

FIG. 3 is a flow chart of the conventional manner of harvesting and processing Alaskan shrimp. This conventional procedure will now be described and in the description reference will be made to the changes in handling involved in my invention.

The steps are as follows:

A. Fishing Boat Phase

1. Harvesting

The shrimp are harvested by known harvesting techniques, e.g. beam or otter trawl techniques.

2. Washing and fish removal

The shrimp are washed on the deck of the fishing vessel with salt water to remove mud and sand. Other species of fish which may be in the catch are removed by hand.

3. Shrimp storage

The shrimp are shoveled through the deck plate or hatch into a below the deck storage area or hold in the fishing vessel.

4. Shrimp icing

As the shrimp drop onto the bottom of the hold they are iced by a crewman who with a shovel attempts to substantially uniformly distribute ice over the shrimp. When the shrimp-ice mixture is nearly piled as high as possible, the pile is topped off by a layer of ice.

The general practice today is to use flake ice. Until several years ago ground ice manufactured from block ice was employed and still may be employed. However, ground block ice is not considered to be as desirable as flake ice, at least for icing shrimp.

Here is where a first departure in the prior technique is made when practicing my invention. According to my invention, ice is used which contains a water binding phosphate. However, this change involves no additional handling step or any change in the time which it takes to ice the shrimp.

B. Processing plant phase

5. Unloading of shrimp from vessel

Three methods have been employed for unloading shrimp from a vessel. They are (1) pneumatic conveyor (2) hydraulic conveyor and (3) tote (hand or mechanical carrying) unloading. The latter method is the one that is in most common use. It generally involves workmen using pitch forks for picking up the shrimp and ice and placing them into plastic or metal totes which, when loaded, will weight between 500–1,000 lbs.

According to an important aspect of my invention, the hydraulic method of unloading is not employed because such method would contact the treated shrimp with water and possibly result in a leaching of the phosphate compound out from the meat to such an extent that the treatment would not be effective.

6. Fish Removal/Washing

Any fish remaining in the catch are removed by hand so that they will not go through the peeler. Washing is not really intended in this instance to clean the fish, but rather is used to assist in spreading shrimp out on an inspection belt for fish removal. Preferably, this step is eliminated when my invention is practiced, to avoid bringing the shrimp into contact with water.

7. Optional Sizegrading

Sometimes shrimp are graded into several sizes for the purpose of maximizing cooked meat yield. This is especially true if there is wide size distribution in a particular load of shrimp. After grading, each size may be cooked at its optimum time/temperature combination.

After grading, the shrimp are conveyed to a cooker or are iced and held for further processing. In the preferred form of my invention, any conveying of the shrimp is done on a "dry" basis, i.e. not by use of a water flume or the like. Also, if further iceing is done, additional phosphate containing ice would be used.

8. Conveyance to cooker/peeler

This step is conventionally accomplished by the use of water flumes or totes. In accordance with an aspect of my invention, totes should be used instead of water flume, to prevent washing out of the phosphate from the shrimp.

9. Cooker/peeler

Conventionally shrimp are dumped into a water containing trough or hopper located immediately prior to the steam portion of the cooker/peeler. Shrimp are then conveyed by a perforated plastic belt through a steam cooker and onto the shell removal or peeling portion of the machine. Again, in accordance with the preferred form of my invention, no water is used in the trough or hopper. That is, the shrimp are "dry fed" to the cooker/peeler. By way of example, the cooker/peeler may be the Model PCA unit manufactured by The Laitram Corporation, a well known manufacture of cooker/peelers.

After the cooking process the shrimp may be exposed to water.

10. Washer

At this stage water is used for removing appendages from the cooked and peeled shrimp meat.

11. Separater

The waste materials which have been detached from cooked shrimp meat by the peeler are new separated from the cooked shrimp meat.

12. Air removal of waste material

The waste shell is literally vacuumed off the shrimp meat by passing the meat under a suction device.

13. Inspection

At this stage employees make a visual inspection of meat and pick out defects and/or unwanted substances from the cooked peeled meat.

14. Grading

The shrimp may be size graded if conditions dictate.

15. Brine soak

The shrimp may receive a short soak in table salt brine, to improve flavor, and then be drained.

16. Shrimp Freezing

The shrimp meat may be individually quick frozen, sprayed or glazed with water and packaged, or packaged and then blast or plate frozen.

In accordance with an aspect of my invention, the shrimp is not brought into contact with water from the time that it is removed from its storage place aboard the ship up until it it actually introduced into the cooker section of the cooker/peeler machine.

The following is a summary of at least some of the advantages obtained by treating shrimp by the process of my invention:

1. Moisture and nutrient losses from the shrimp during storage and processing are minimized, thus resulting in an increased cooked meat yield and improvements in edibility and nutritional value.

2. The shrimp are treated while on the fishing vessel with no additional effort by the crew being necessary.

3. The treated shrimp are ready to process upon receipt at the processing plant.

4. The treated ice is colder, lasts longer, and has improved flaking characteristics. This means that a given quantity of flake ice will last longer; i.e., will cook shrimp longer, than the same quantity of plain water ice.

5. The processed shrimp meat has an improved color; the reddish pigment color is increased in intensity.

6. It is also believed that the treatment may result in a bacteriological action on certain bacteria which may be associated with fresh shrimp spoilage.

It is to be understood that it is the following claims and not the foregoing description which limits the scope of my invention. The claims are directed to the treatment of shrimp, but it is desired that the claims be interpreted to cover the treatment of any other type of fish on which practice of the method steps, as claimed, would produce the same benefits which I have obtained by practicing the invention on shrimp.

What is claimed is:

1. A method of treating shrimp aboard a fishing vessel to reduce the amount of moisture and nutrient loss from the shrimp during storage aboard the vessel and during processing, comprising:
   catching the shrimp and then promptly storing the shrimp as harvested aboard the vessel in ice particles which contains an amount effective to reduce moisture and nutrient loss of a moisture binding phosphate compound, so that as said ice melts to cool the shrimp the shrimp will be wetted by water containing the moisture binding phosphate compound.

2. The method of claim 1, comprising using flake ice.

3. The method of claim 1, comprising using ice containing an effective amount of sodium tripolyphosphate.

4. The method of claim 1, comprising using flake ice containing an effective amount of sodium tripolyphosphate.

5. The method of claim 1, comprising using ice containing about 1.0–2.0% of sodium tripolyphosphate, by weight.

6. The method of claim 1, comprising using flake ice containing about 1.0–2.0% of sodium tripolyphosphate, by weight.

7. The method of claim 1, further comprising conveying the iced shrimp without washing from ice storage to a cooker.

8. A method of treating shrimp while in the shell to reduce moisture and nutrient loss, comprising:
   delivering water to a flake ice machine, admixing an amount effective to reduce moisture and nutrient loss of a moisture binding phosphate compound with the water while delivering the water to the flake ice machine, so that such compound will be incorporated into the ice, resulting in colder ice with a greater cooling capacity than plain water ice, and
   collecting flakes of ice from such machine;
   mixing such flake ice with shrimp within a storage region aboard a fishing vessel, as such shrimp is caught, said mixed ice and shrimp resulting in shrimp being wetted by water containing moisture binding phosphate compound, as the ice melts.

9. The method of claim 8, comprising admixing an effective amount of sodium tripolyphosphate with the water.

10. The method of claim 9, comprising admixing sodium tripolyphosphate with the water in an amount resulting in the ice containing about 1.0–2.0% of sodium tripolyphosphate, by weight.

11. The method of claim 8, further comprising conveying the iced shrimp from ice storage without washing to a cooker.

12. A method of treating shrimp to reduce the amount of moisture and nutrient loss from the shrimp during storage aboard a fishing vessel and during processing, comprising:

storing the shrimp aboard the vessel in ice particles which contains an amount effective to reduce moisture and nutrient loss of a moisture binding phosphate compound, so that as said ice melts to cool the shrimp the meat will be wetted by water containing the moisture binding phosphate compound; and conveying the iced shrimp without washing from ice storage aboard the fishing vessel to cooking.

13. The method of claim 12, comprising using flaked ice.

14. The method of claim 12, comprising using ice containing an effective amount of sodium tripolyphosphate.

15. The method of claim 12, comprising using flake ice containing an effective amount of sodium tripolyphosphate.

16. The method of claim 12, comprising using ice containing about 1.0–2.0% of sodium tripolyphosphate, by weight.

* * * * *